L. B. LARSEN, O. J. HOLMES & H. G. LARSEN.
MOTION PICTURE MACHINE.
APPLICATION FILED NOV. 8, 1917.

1,287,353.

Patented Dec. 10, 1918.
5 SHEETS—SHEET 1.

Fig. 1.

Witness:
John Enders

Inventors.
Louis B. Larsen, Oscar J. Holmes
and Hans G. Larsen,
by Robert Burns
Atty.

L. B. LARSEN, O. J. HOLMES & H. G. LARSEN.
MOTION PICTURE MACHINE.
APPLICATION FILED NOV. 8, 1917.

1,287,353.

Patented Dec. 10, 1918.
5 SHEETS—SHEET 3.

Witness:
John Enders

Inventors:
Louis B. Larsen,
Oscar J. Holmes &
Hans G. Larsen,
by Robert Burns
Atty.

L. B. LARSEN, O. J. HOLMES & H. G. LARSEN.
MOTION PICTURE MACHINE.
APPLICATION FILED NOV. 8, 1917.

1,287,353.

Patented Dec. 10, 1918.
5 SHEETS—SHEET 4.

Witness:
John Enders

Inventors:
Louis B. Larsen, Oscar J. Holmes
and Hans G. Larsen,
by
Robert Burns
Atty.

L. B. LARSEN, O. J. HOLMES & H. G. LARSEN.
MOTION PICTURE MACHINE.
APPLICATION FILED NOV. 8, 1917.

1,287,353.

Patented Dec. 10, 1918.
5 SHEETS—SHEET 5.

Witness:
John Enders

Inventors:
Louis B. Larsen,
Oscar J. Holmes and
Hans G. Larsen,
by Robert Burns
Atty.

UNITED STATES PATENT OFFICE.

LOUIS B. LARSEN, OSCAR J. HOLMES, AND HANS G. LARSEN, OF CHICAGO, ILLINOIS, ASSIGNORS TO ACME MOTION PICTURE PROJECTOR COMPANY, A CORPORATION OF ILLINOIS.

MOTION-PICTURE MACHINE.

1,287,353.      Specification of Letters Patent.      Patented Dec. 10, 1918.

Application filed November 8, 1917. Serial No. 200,877.

*To all whom it may concern:*

Be it known that we, LOUIS B. LARSEN, OSCAR J. HOLMES, and HANS G. LARSEN, citizens of the United States of America, and residents of Chicago, in the county of Cook, State of Illinois, have invented certain new and useful Improvements in Motion-Picture Machines, of which the following is a specification.

This invention relates to that class of portable motion picture machines in which the film feeding mechanism, film reels and illuminating means are disposed in a closed and readily portable casing, and has for its objects:—

To provide a simple and compact structural formation and combination of parts comprising the carrying and operating means of a pair of coöperating film reels of a motion picture machine, adapted at one time to afford an effective take-up revolution of film reel which receives the film after the same has passed through the film feeding mechanism, and at another time to provide a rapid revolution of the film receiving reel in the usual film rewinding operation, and which is usually performed immediately following an exhibition or projection of the picture of the roll of film.

To provide a simple and efficient arrangement of the different mechanisms and parts of a motion picture machine, whereby a compact and convenient relative disposition of said mechanisms and parts is provided, all as will hereinafter more fully appear.

In the accompanying drawings:—

Like reference numerals indicate like parts in the several views.

Referring to the drawings, 1 designates the main or inclosing casing of the machine, preferably of the rectangular box form shown, and having a hinged side wall or door 2 for convenient access to the inclosed mechanisms and parts of the machine.

3 designates the lamp house or inclosure, arranged in the upper and rear portion of the casing 1, and adapted to house the incandescent electric lamp 4, by which the illumination of the machine is provided. In the construction shown the bottom wall of the lamp housing is formed by a laterally removable plate 3' which in turn carries a depending socket 4' adapted to receive the lamp 4.

5 designates the optical condenser, and 6 designates the objective of the apparatus, of any usual and suitable type, and alined with each other and with the filament of the lamp 4, as usual in the present class of machines.

7 designates an operating shaft extending out through the top wall of the casing 1, and provided at its outer end with an operating handle or knob for convenient manual rotation. At its inner end the shaft 7 has crank and pitman connection 8 with the movable member of the objective 6 for effecting a focusing adjustment of said objective.

9 designates the fixed apertured film guide or plate by which the picture film is guided transversely through the optical center of the machine in proper spaced relation to the rear portion of the objective 6 aforesaid. Said film guide 9 and the associated film feeding mechanism may be of any ordinary and suitable construction, but are preferably of the construction shown in the drawings and which forms the subject matter of a prior application for Letters Patent, Serial No. 196,129, filed October 12, 1917, and consisting as follows:—

10 designates a track frame secured to a side wall of the casing 1, and to which the aforesaid film guide or plate 9 is fixedly attached by a lateral carrying bracket 11 as shown. The track frame 10 also carries lateral brackets or posts to the ends of which are secured upper and lower longitudinally disposed tracks or slideways 12 for the guidance of the hereinafter described carriage of the film feeding mechanism, in a longitudinal plane parallel with the optical axis of the machine.

13 designates the carriage above referred to preferably of the plate form shown, and having sliding engagement with the aforesaid tracks or slideways 12.

14 designates an operating shaft journaled on the track frame 10, and carrying a pinion 15 having operative engagement with a rack bar on the carriage 13 aforesaid, and adapted to effect a longitudinal adjustment of said carriage. The end of the shaft 14 opposite to that carrying pinion 15, extends out through the top wall of the casing 1 and is provided with a handle or knob for convenient manual actuation.

16 designates the driving shaft by which the intermittent film feeding mechanism and the light shutter of the machine are operated in unison. The shaft 16 is journaled in the carriage 13, and in addition to the usual gearing connection 17 with an operating shaft 18 capable of manual rotation, has power connection by pulley and endless belt 19 with an electric motor 20 hereinafter described in detail. In the structure shown, the electric motor 20, in addition to affording driving power for the film feeding mechanism as above set forth, also furnishes power for operating the film take-up and film rewinding mechanisms hereinafter described in detail.

21 designates the light shutter before referred to, preferably of the radial bladed type and carried by a shaft 22, journaled longitudinally on the carriage 13 aforesaid, so as to be adjustable longitudinally therewith, and is provided at its rear end with gearing connection 23 with the driving shaft 16 above described.

Figure 1:
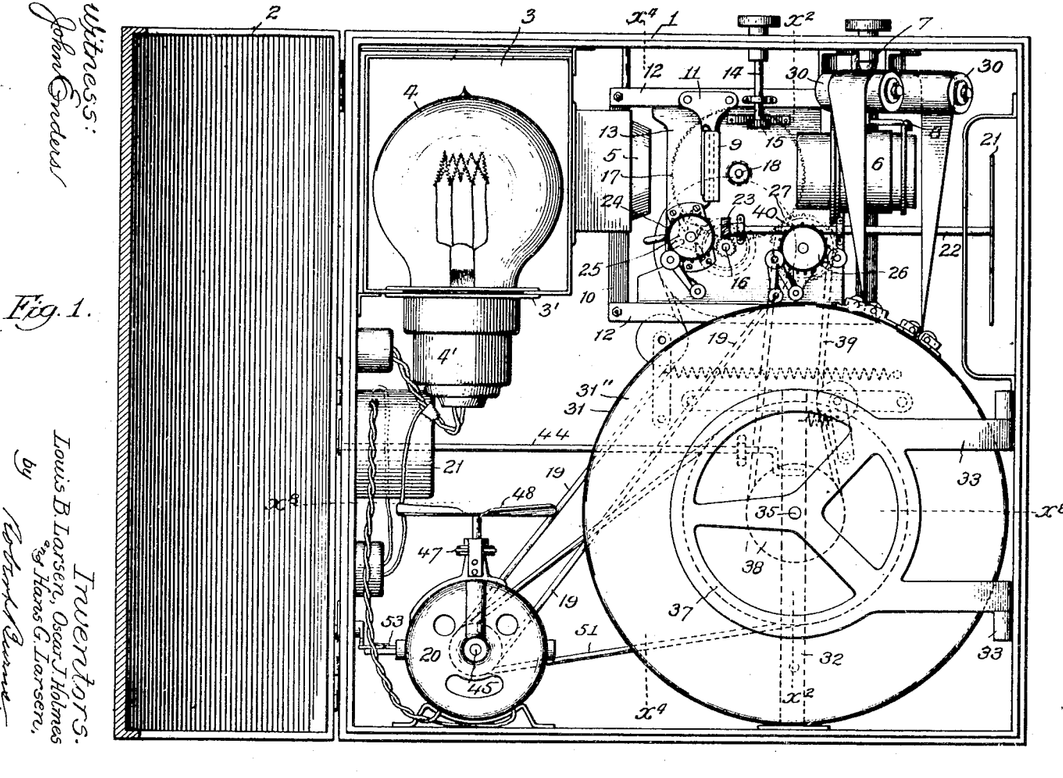
Figure 1, is a side elevation of a motion picture machine embodying the present invention, a hinged side wall or door of the inclosing casing being shown in an open condition and in section, and the picture film shown in a rewind position.

24 designates the intermittent film feeding sprocket drum journaled in the carriage 13 aforesaid, in operative relation to the lower end of the film guide 9, and carrying the driven element of an intermittent gearing device such as the ordinary Geneva movement 25 shown in Fig. 1, the driving element of said intermittent gearing being fixed to the operating shaft 16 aforesaid.

26 designates the sprocket drum by which the usual free loop in the picture film is maintained at the upper or entrance end of the film guide or plate 9. The carrying shaft of said drum 26 is also journaled in the carriage 13 and receives constant rotation from the shaft 18 through gearing 27. In the preferred construction shown, the sprocket drum 26 is arranged in a plane to one side of the plane in which the intermittent film feeding sprocket drum 24 is arranged, and in line with the film delivery reel 28 of the machine, while the aforesaid film feeding sprocket drum 24 is in line with the film take-up reel 29 of the machine in the normal operation of same as a picture projecting apparatus.

Figure 2:
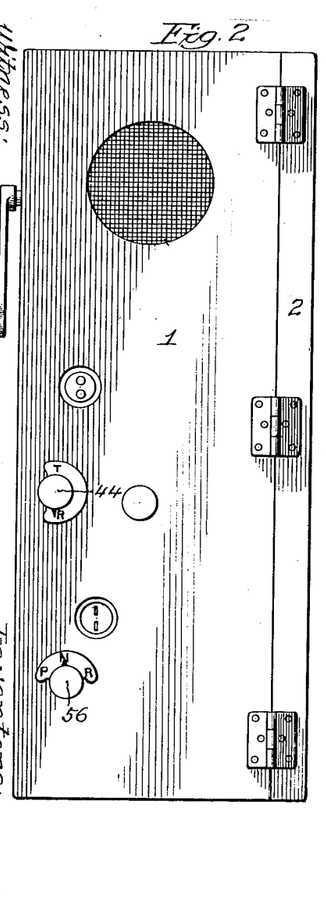
Fig. 2, is a rear elevation of the inclosing casing showing the location of the manual actuating means of some of the internal controlling mechanisms of the machine.
Figure 3:
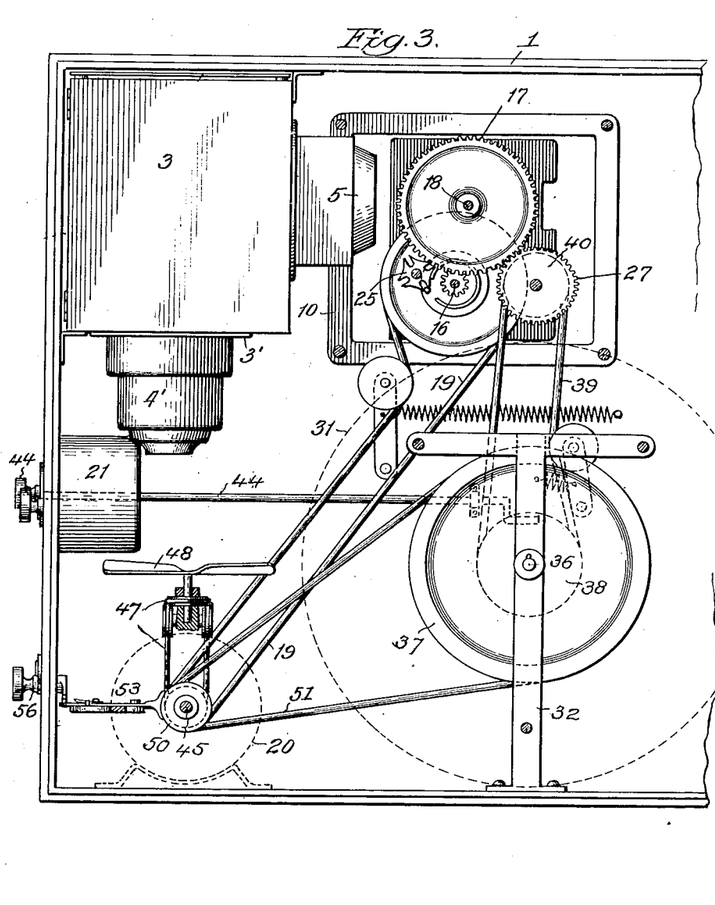
Fig. 3, is a detail longitudinal sectional elevation on line $x^3$—$x^3$, Fig. 6.
Figures 4, 5:
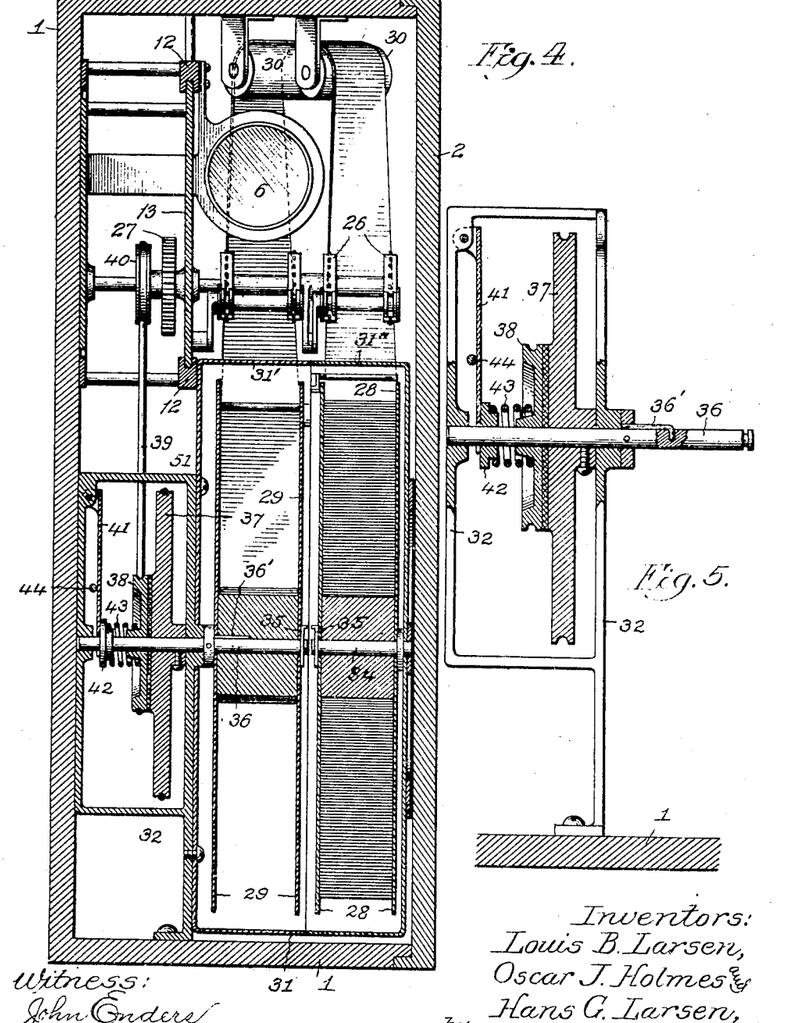
Fig. 4, is a transverse sectional elevation on line $x^2$—$x^2$, Fig. 1 in a direction to the right in said Fig. 1.
Fig. 5, is an enlarged detail transverse section of the reel carrying shaft and accessories of the film rewind mechanism.
Figures 6, 7:
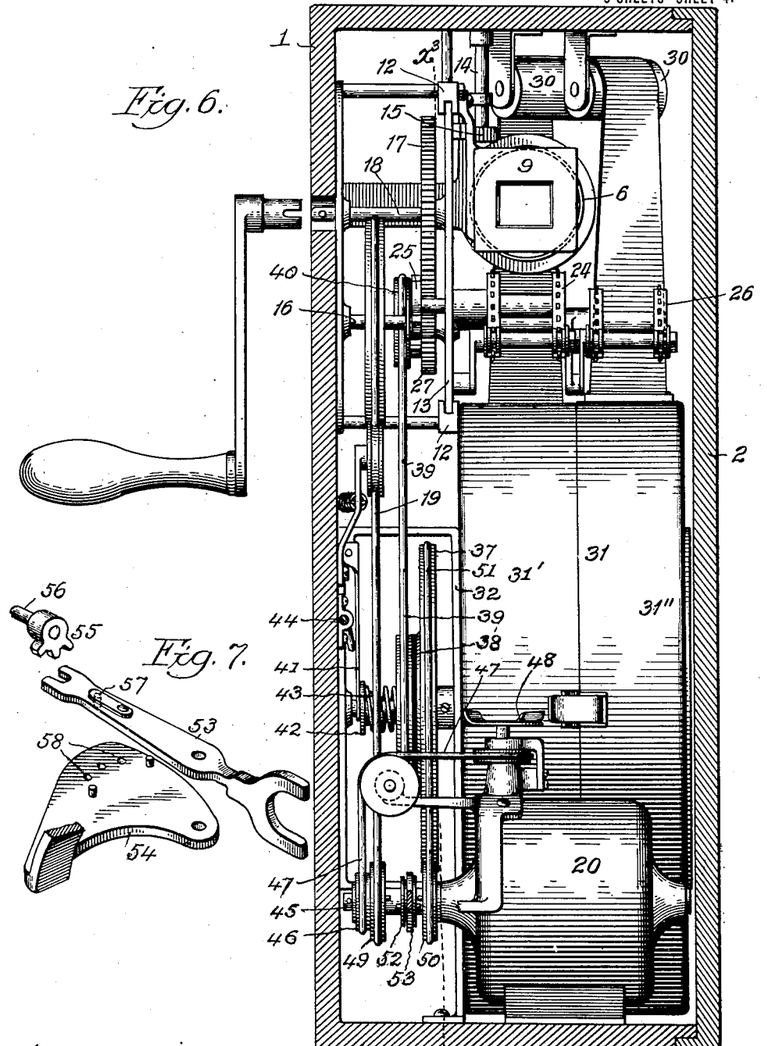
Fig. 6, is a transverse sectional elevation on line $x^4$—$x^4$, Fig. 1, in a direction to the left in said Fig. 1.
Fig. 7, is a detail perspective view of the operating lever and accessories of the clutch mechanism of the motor shaft.

30 designates a pair of idler drums journaled in the upper and forward end of the main casing 1, in horizontal spaced relation to each other and disposed in oblique relation to the optical center of the machine as illustrated in Figs. 1, 2 and 4. As so arranged the drums 30 are adapted to maintain an oblique loop in the picture film, after the same has been unthreaded from the intermittent film feeding mechanism and apertured film guide heretofore described, and placed over said drums 30, in the operation of changing the present mechanism to a film rewinding condition. In effecting such change, the take-up reel containing the reversely wound picture film which has just passed through the viewing mechanism of the machine, is taken from the take-up reel shaft 36, hereinafter described, and placed on the supply reel shaft 34, hereinafter described, and is adapted to turn freely thereon. An empty film reel is then placed on the aforesaid take-up reel shaft 36, and after the end of the picture film aforesaid is connected thereto in the usual manner, the rewinding of the film is effected by the rotation of the last mentioned reel.

The delivery reel 28 and the take-up reel 29 above referred to are arranged in a reel casing or magazine 31, the detail construction and accessories of which constitute the subject matter of a separate application for Letters Patent Serial No. 200,878, filed Nov. 8, 1917, and consisting as follows:—

The reel magazine above referred to consists of two approximately counterpart cup shaped portions 31′, 31″, the circular margins of which are adapted to abut against each other to provide a single chamber within the magazine of a width sufficient to receive a pair of film reels side by side.

Figures 8, 9, 10, 11:
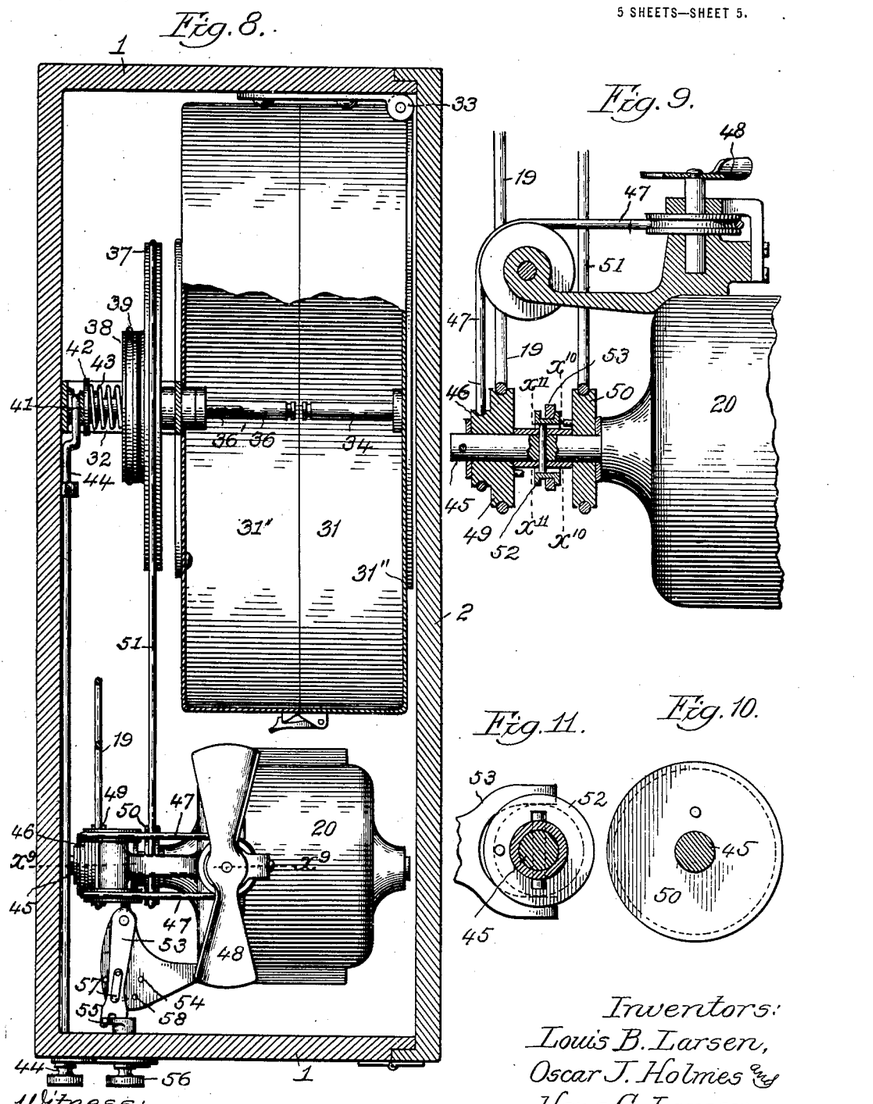
Fig. 8, is a horizontal sectional elevation on line $x^8$—$x^8$, Fig. 1.
Fig. 9, is a detail transverse sectional elevation on line $x^9$—$x^9$, Fig. 8.
Fig. 10, is a detail longitudinal section on line $x^{10}$—$x^{10}$, Fig. 9.
Fig. 11, is a similar view on line $x^{11}$—$x^{11}$, Fig. 9.

The magazine portion 31′ is fixed within the main casing 1, preferably by a supporting standard or frame 32, while the companion magazine portion 31″ is capable of a horizontal swinging movement in relation to the other portion 31′, on a hinge connection 33, as shown more particularly in Fig. 8. And each magazine portion 31′ and 31″ is provided with an individual peripheral orifice for the passage of the film to and from the reel arranged in a magazine section aforesaid.

34 designates a centrally arranged reel carrying shaft fixedly secured to the end wall of the magazine portion 31'' and provided at its free end with a peripheral groove adapted for engagement with a latch piece 35 on a film reel to hold said reel against lateral displacement in actual use, while leaving said reel free to revolve upon the spindle 34.

36 designates a reel carrying shaft journaled in the supporting frame 32 aforesaid, and extending centrally into the interior of a fixed magazine portion 31' and adapted to support a film reel therein, said reel being held in rotative engagement with said shaft by a spline or key 36' engaging in a corresponding slot or keyway in the central bore of the reel hub. And said reel is also held from lateral disengagement by a latch piece 35, a counterpart of the one above described.

37 designates a grooved pulley fixed on the reel shaft 36 aforesaid, and having an endless belt connection with a pulley loosely mounted on the power shaft as hereinafter described in detail. In the present structure the pulley 37 receives positive rotation from the motor shaft in the rewinding operation of the picture film after the same has been fed through and projected by the exhibiting means of the machine. At other times said pulley 37 is out of operative engagement with said motor shaft.

38 designates a groove pulley mounted loose on the reel shaft 36 aforesaid, and having endless belt connection 39 with a grooved pulley 40 secured to the carrying shaft of the loop forming sprocket drum 26 heretofore described. One side of the pulley 38 is formed in any usual manner for frictional engagement with the adjacent side of the fixed pulley 37 aforesaid; and is adapted to be moved into and resiliently held in frictional engagement with said pulley 37 by means as follows:—

41 designates a lever pivoted at one end to the magazine supporting frame 32 aforesaid, with its free end in bearing engagement against an abutment collar 42 slidable on the reel shaft 36 aforesaid.

43 designates a coiled spring encircling the reel shaft 36 and disposed between the loose pulley 38 and the collar 42 and adapted to yieldingly transmit a stress from said collar 42 and lever 41 to the pulley 38 and thus attain the required frictional engagement between the pulleys 37 and 38 aforesaid.

44 designates a crank shaft extending longitudinally of the main casing 1, with one end extending through the rear end wall of said casing and provided with a handle or knob for convenient manual operation. The other end of the shaft 44 carries a crank portion having operative engagement with the lever 41 aforesaid, and adapted to operate said lever to compress the spring 43, and to relieve said spring 43 from compressive stress, as required in the different operations of the machine. The above described frictional driving engagement between the pulley 38 and the pulley 37 of the reel carrying shaft 37, is effective during the operation of the machine in projecting a series of pictures and is adapted to cause a take-up of the film as the same comes from the intermittent film feeding mechanism on the machine during such picture projecting operation.

45 designates the power shaft of the electric motor 20 heretofore referred to, and upon which is mounted a series of driving pulleys now to be described.

46 designates a grooved pulley fixedly secured to the shaft 45 and having endless belt connection 47 with a similar pulley on the carrying shaft of a fan 48, by which ventilation and cooling of the lamp house and the parts of the inclosed mechanism through which the picture film moves is effected as set forth in a separate application for Letters Patent, Serial No. 200,879 filed Nov. 8, 1917.

49 designates a grooved pulley mounted loose on the shaft 45 and forming part of the pulley and endless belt connection 19 of the intermittent film feeding mechanism heretofore described.

50 designates a grooved pulley also mounted loose on the shaft 45 in spaced relation to the aforesaid pulley 49 and having endless belt connection 51 with the grooved pulley 37 of the reel carrying shaft 36 heretofore described.

52 designates a sliding clutch member having movement with and on the shaft 45 and adapted to assume three positions to wit: first, in clutch engagement with the pulley 49 to drive the film feeding mechanism of the machine; second in clutch engagement with the pulley 50 to drive the film rewind mechanism of the machine, and third, in an intermediate position out of clutch engagement with both pulleys 49 and 50. Such last mentioned position prevails when the machine is operated by hand through the mechanism heretofore described.

53 designates a clutch operating lever pivoted to a carrying bracket 54 on the motor 20, and having one end formed as a yoke for operative engagement with the sliding clutch member 52 aforesaid. The other end of said lever is formed with gear teeth having operative engagement with a gear sector 55 on a shaft 56 journaled in the main casing 1 and having an exterior handle or knob for convenient manual operation.

57 designates a spring impelled stud mounted on the clutch lever 52 and adapted to yieldingly engage in any one of the three recesses 58 in the bracket 54 to hold said lever and its associated clutch member at the different adjustments heretofore described.

The usual spring impelled tightener drums will be employed in connection with the various endless belts of the machine to insure proper frictional contact between said belts and their pulleys.

The relative arrangement and association of the lamp house, motor, film magazine and other parts of the machine above set forth, constitutes a material part of the present invention, as affording a very compact arrangement of the parts within the inclosing casing, and at the same time providing a direct and efficient operation of the mechanisms and an effective ventilation of the heat producing parts thus permitting of the use of a higher light producing lamp than would be found permissible with the ordinary structures heretofore used.

Having thus fully described our said invention what we claim as new and desire to secure by Letters Patent, is:

1. In a motion picture machine having a positively driven sprocket drum for maintaining a supply loop in a picture film, the combination of a pair of reels arranged side by side, a carrying shaft having rotative engagement with one of said reels, a pulley fixed on said shaft, a disconnectible belt connection between said pulley and a driving motor, a pulley mounted loose on said carrying shaft and having frictional engagement with a fixed element of said shaft, and a pulley and belt connection between said loose pulley and the carrying shaft of the loop maintaining sprocket drum aforesaid, substantially as set forth.

2. In a motion picture machine having a positively driven sprocket drum for maintaining a supply loop in a picture film, the combination of a pair of reels arranged side by side, a carrying shaft having rotative engagement with one of said reels, a motor shaft having disconnectible pulley and belt connection with said carrying shaft, a pulley mounted loose on said carrying shaft and having frictional engagement with a fixed element of said shaft, manually actuated means for controlling the frictional engagement of said parts, and a pulley and belt connection between said loose pulley and the carrying shaft of the loop maintaining sprocket drum aforesaid, substantially as set forth.

3. In a motion picture machine having a positively driven sprocket drum for maintaining a supply loop in a picture film, the combination of a pair of reels arranged side by side, a carrying shaft having engagement with one of said reels, a motor shaft having disconnectible pulley and belt connection with said carrying shaft, a pulley mounted loose on said carrying shaft and having frictional engagement with a fixed element of said shaft, means for controlling the frictional engagement of said parts the same comprising a sliding collar on said shaft, a spring interposed between said collar and the loose pulley and a manually actuated crank shaft having operative engagement with said collar, and a pulley and belt connection between said loose pulley and the carrying shaft of the loop maintaining sprocket drum aforesaid, substantially as set forth.

4. In a motion picture machine having a positively driven sprocket drum for maintaining a supply loop in a picture film, the combination of a pair of reels arranged side by side, a carrying shaft having rotative engagement with one of said reels, a motor shaft having disconnectible pulley and belt connection with said carrying shaft, a pulley mounted loose on said carrying shaft and having frictional engagement with a fixed element of said shaft, means for controlling the frictional engagement of said parts, the same comprising a sliding collar on said shaft, a spring interposed between said collar and the loose pulley, a lever engaging said collar and a pulley and belt connection between said loose pulley and the carrying shaft of the loop maintaining sprocket drum aforesaid, substantially as set forth.

5. In a motion picture machine having an intermittent film feeding mechanism, a positively driven sprocket drum for maintaining a supply loop in the picture film and a pair of obliquely arranged film engaging idler drums, the combination of a motor, disconnectible driving connections between said motor and the film feeding mechanism and film looping mechanism aforesaid, a pair of film reels arranged side by side, a carrying shaft having rotative engagement with one of said reels, disconnectible pulley and belt connections between said carrying and motor shafts, a pulley mounted loose on said carrying shaft and adapted for frictional engagement with a fixed element of said shaft and a pulley and belt connection between said loop pulley and carrying shaft of the loop maintaining sprocket drum aforesaid.

6. In a motion picture machine having an intermittent film feeding mechanism, a positively driven sprocket drum for maintaining a supply loop in the picture film and a pair of obliquely arranged film engaging idler drums, the combination of a motor, disconnectible driving connections between said motor and the film feeding mechanism and film looping mechanism aforesaid, a pair of film reels arranged side by side, a carrying shaft having rotative engagement with one of said reels, disconnectible pulley and belt connections between said carrying and motor shafts, a pulley mounted loose on said carrying shaft and adapted for frictional engagement with a fixed element of said shaft, a pulley and belt connection between said loose pulley and the carrying shaft of the loop maintaining sprocket drum aforesaid, and a shiftable clutch adapted to engage one or the other of said driving connections with the motor shaft, substantially as set forth.

7. In a motion picture machine having an intermittent film feeding mechanism, a positively driven sprocket drum for maintaining a supply loop in the picture film and a pair of obliquely arranged film engaging idler drums, the combination of a motor, disconnectible driving connections between said motor and the film feeding mechanism and film looping mechanism aforesaid, a pair of film reels arranged side by side, a carrying shaft having rotative engagement with one of said reels, disconnectible pulley and belt connections between said carrying and motor shaft, a pulley mounted loose on said carrying shaft and adapted for frictional engagement with a fixed element of said shaft, a pulley and belt connection between said loose pulley, and the carrying shaft of the loop maintaining sprocket drum aforesaid, and a shiftable clutch adapted in one position to engage one of said driving connections with the motor shaft, in another position to engage another of said driving connections with the motor shaft and in another position to leave both of said connections free from engagement with the motor shaft, and manually actuated means for operating the film feeding mechanism aforesaid, substantially as set forth.

8. In a motion picture machine having an intermittent film feeding mechanism, a positively driven sprocket drum for maintaining a supply loop in the picture film and a pair of obliquely arranged film engaging idler drums, the combination of a motor, disconnectible driving connections between said motor and the film feeding mechanism and film looping mechanism aforesaid, a pair of film reels arranged side by side, a carrying shaft having rotative engagement with one of said reels, disconnectible pulley and belt connections between said carrying and motor shafts, a pulley mounted loose on said carrying shaft and adapted for frictional engagement with a fixed element of said shaft, a pulley and belt connection between said loose pulley and the carrying shaft of the loop maintaining sprocket drum aforesaid, a shiftable clutch adapted to engage one or the other of said driving connections with the motor shaft, a pivoted lever engaging said clutch, and a shaft adapted for manual rotation and having operative engagement with said lever by a gearing connection, substantially as set forth.

9. In a motion picture machine having an intermittent film feeding mechanism, a positively driven sprocket drum for maintaining a supply loop in the picture film and a pair of obliquely arranged film engaging idler drums, the combination of a motor, disconnectible driving connections between said motor and the film feeding mechanism and film looping mechanism aforesaid, a pair of film reels arranged side by side, a carrying shaft having rotative engagement with one of said reels, disconnectible pulley and belt connections between said carrying and motor shafts, a pulley mounted loose on said carrying shaft and adapted for frictional engagement with a fixed element of said shaft, a pulley and belt connection between said loose pulley and the carrying shaft of the loop maintaining sprocket drum aforesaid, a shiftable clutch adapted to engage one or the other of said driving connections with the motor shaft, a pivoted lever engaging said clutch, yielding means for holding said lever at its different adjustments and a manually actuated shaft having operative connections with said lever, substantially as set forth.

10. In a motion picture machine having a positively driven sprocket drum for maintaining a supply loop in a picture film, the combination of the pair of reels arranged side by side, a shaft section or spindle loosely supporting one of said reels, a driving shaft section rotatably engaging another of said reels, a motor shaft having disconnectible pulley and belt connection with said driving shaft section, a pulley mounted loose on said shaft section and having frictional engagement with a fixed element of said shaft section, and a pulley and belt connection between said loose pulley and the carrying shaft of the loop maintaining sprocket drum aforesaid, substantially as set forth.

11. In a motion picture machine having a positively driven sprocket drum for maintaining a supply loop in a picture film, the combination of a pair of reels arranged side by side, a shaft section or spindle loosely supporting one of said reels, a driving shaft section rotatably engaging another of said reels, a motor shaft having disconnectible pulley and belt connection with said driving shaft section, a pulley mounted loose on said shaft section and having frictional engagement with a fixed element of said shaft section, manually actuated means for controlling the frictional engagement of said parts and a pulley and belt connection between said loose pulley and the carrying shaft of the loop maintaining sprocket drum aforesaid, substantially as set forth.

12. In a motion picture machine having a positively driven sprocket drum for maintaining a supply loop in a picture film, the combination of a pair of reels arranged side by side, a shaft section or spindle loosely supporting one of said reels, a driving shaft section rotatably engaging another of said reels, a motor shaft having disconnectible pulley and belt connection with said driving shaft section, a pulley mounted loose on said shaft section and having frictional engagement with a fixed element of said shaft section, means for controlling the frictional engagement of said parts, the same comprising a sliding collar on said shaft section, a spring interposed between said collar and said loose pulley and a manually actuated crank shaft having operative engagement with said collar, and a pulley and belt connection between said loose pulley and the carrying shaft of the loop maintaining sprocket drum aforesaid, substantially as set forth.

13. In a motion picture machine having an intermittent film feeding mechanism, a positively driven sprocket drum for maintaining a supply loop in the picture film and a pair of obliquely arranged film supporting idler drums, the combination of a motor, disconnectible driving connections between said motor and the film feeding and film looping mechanisms aforesaid, a pair of film reels arranged side by side, a shaft section or spindle loosely supporting one of said reels, a driving shaft section rotatably engaging another of said reels, disconnectible driving connections between said motor and the driving shaft section aforesaid, a pulley mounted loose on said driving shaft section and adapted for frictional engagement with a fixed element of said shaft section, and a pulley and belt connection between said loose pulley and the carrying shaft of the loop maintaining sprocket drum aforesaid, substantially as set forth.

14. In a motion picture machine having an intermittent film feeding mechanism, a positively driven sprocket drum for maintaining a supply loop in the picture film and a pair of obliquely arranged film supporting idler drums, the combination of a motor, disconnectible driving connections between said motor and the film feeding and film looping mechanism aforesaid, a pair of film reels arranged side by side, a shaft section or spindle loosely supporting one of said reels, a driving section rotatably engaging another of said reels, disconnectible driving connections between said motor and the driving shaft section aforesaid, a pulley mounted loose on said driving shaft section and adapted for frictional engagement with a fixed element of said shaft section, a pulley and belt connection between said loose pulley and the carrying shaft of the loop maintaining sprocket drum aforesaid and a shiftable clutch adapted to engage one or the other of said driving connections with the motor shaft, substantially as set forth.

15. In a motion picture machine having an intermittent film feeding mechanism, a positively driven sprocket drum for maintaining a supply loop in the picture film and a pair of obliquely arranged film supporting idler drums, the combination of a motor, disconnectible driving connections between said motor and the film feeding and film looping mechanisms aforesaid, a pair of film reels arranged side by side, a shaft section or spindle loosely supporting one of said reels, a driving shaft section rotatably engaging another of said reels, disconnectible driving connections between said motor and the driving shaft section aforesaid, a pulley mounted loose on said driving shaft section and adapted for frictional engagement with a fixed element of said shaft section, a pulley and belt connection between said loose pulley and the carrying shaft of the loop maintaining sprocket drum aforesaid, a shiftable clutch adapted in one position to engage one of said driving connections with the motor shaft, in another position to engage another of said driving connections with the motor shaft and in another position to leave both driving connections free from engagement with the motor shaft, and manually actuated means for operating the film feeding mechanism aforesaid, substantially as set forth.

Signed at Chicago, Illinois, this 31st day of October, 1917.

LOUIS B. LARSEN.
OSCAR J. HOLMES.
HANS G. LARSEN.